(12) United States Patent
Junk et al.

(10) Patent No.: US 9,893,770 B2
(45) Date of Patent: Feb. 13, 2018

(54) BASE STATION FOR GATHERING DATA FROM LOCALIZED SENSORS

(71) Applicant: Fisher Controls International LLC, Marshalltown, IA (US)

(72) Inventors: Kenneth William Junk, Marshalltown, IA (US); Annette Lynn Latwesen, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 15/183,439

(22) Filed: Jun. 15, 2016

(65) Prior Publication Data

US 2017/0005703 A1 Jan. 5, 2017

Related U.S. Application Data

(60) Provisional application No. 62/187,913, filed on Jul. 2, 2015.

(51) Int. Cl.
*H04B 5/00* (2006.01)
*G01D 9/00* (2006.01)
(Continued)

(52) U.S. Cl.
CPC ............ *H04B 5/0056* (2013.01); *G01D 9/00* (2013.01); *G06F 13/385* (2013.01); *G06Q 10/00* (2013.01); *H04B 5/0043* (2013.01); *H04W 4/008* (2013.01); *H04W 52/0219* (2013.01); *H04W 84/18* (2013.01)

(58) Field of Classification Search
CPC .... H04B 5/0056; G06K 19/0717; G06F 17/40
See application file for complete search history.

(56) References Cited

U.S. PATENT DOCUMENTS 5,420,578 A 5/1995 O'Brien et al.
7,058,542 B2 6/2006 Hauhia et al.
(Continued)

FOREIGN PATENT DOCUMENTS

DE 102009006662 7/2010
DE 102011081517 2/2013
(Continued)

OTHER PUBLICATIONS

International Searching Authority, "International Search Report", issued in connection with International Patent Application No. PCT/US2014/041265, dated Sep. 17, 2014 (3 pages).
(Continued)

*Primary Examiner* — Curtis Odom
(74) *Attorney, Agent, or Firm* — Hanley, Flight & Zimmerman, LLC

(57) ABSTRACT

A base station for gathering data from localized sensors is described. An example apparatus includes a sensor to be operatively coupled to field equipment, the sensor having a radio frequency transmitter to send a signal to a base station, the base station having a radio frequency interface to receive the signal from the sensor and a first controller to collect data from the signal and store the data in a memory. The apparatus further includes a second controller operatively coupled to the first controller to relay the data to an asset management system and a local control panel operatively coupled to the base station to send additional data to the base station, wherein the first controller stores the additional data in the memory.

22 Claims, 5 Drawing Sheets

(51) Int. Cl.
*G06F 13/38* (2006.01)
*G06Q 10/00* (2012.01)
*H04W 4/00* (2009.01)
*H04W 52/02* (2009.01)
*H04W 84/18* (2009.01)

(56) References Cited

U.S. PATENT DOCUMENTS

| | | | |
|---|---|---|---|
| 7,828,008 B1* | 11/2010 | Beckman | F16K 37/0091 137/487.5 |
| 8,212,655 B2 | 7/2012 | Nelson et al. | |
| 8,384,519 B2 | 2/2013 | Kuhl et al. | |
| 8,860,611 B1 | 10/2014 | Anderson et al. | |
| 9,392,103 B2 | 7/2016 | Maguire et al. | |
| 2002/0067267 A1 | 6/2002 | Krikham | |
| 2005/0280511 A1 | 12/2005 | Yokoyama et al. | |
| 2006/0200256 A1 | 9/2006 | Mason et al. | |
| 2006/0244568 A1 | 11/2006 | Tong et al. | |
| 2007/0021140 A1 | 1/2007 | Keyes, IV et al. | |
| 2007/0114280 A1 | 5/2007 | Coop et al. | |
| 2008/0048837 A1 | 2/2008 | Montgomery et al. | |
| 2008/0238679 A1 | 10/2008 | Rofougaran et al. | |
| 2008/0277463 A1 | 11/2008 | Braun | |
| 2009/0303898 A1 | 12/2009 | Isenmann et al. | |
| 2010/0231407 A1 | 9/2010 | Carr | |
| 2010/0302008 A1 | 12/2010 | Engelstad et al. | |
| 2011/0131455 A1 | 6/2011 | Law et al. | |
| 2011/0279239 A1 | 11/2011 | Gravelle et al. | |
| 2012/0068827 A1 | 3/2012 | Yi et al. | |
| 2012/0135681 A1 | 5/2012 | Adams et al. | |
| 2013/0035802 A1 | 2/2013 | Khaitan et al. | |
| 2013/0134226 A1 | 5/2013 | Chen | |
| 2013/0141888 A1 | 6/2013 | Wittmer et al. | |
| 2013/0190897 A1 | 7/2013 | Junk et al. | |
| 2013/0249301 A1* | 9/2013 | Smoot | G06K 19/0707 307/104 |
| 2013/0288595 A1 | 10/2013 | Lee et al. | |
| 2014/0062661 A1 | 3/2014 | Gallo et al. | |
| 2014/0203915 A1* | 7/2014 | Puleston | H04L 67/04 340/10.1 |
| 2014/0361087 A1 | 12/2014 | Lovell et al. | |
| 2014/0364963 A1 | 12/2014 | Lovell et al. | |
| 2015/0088617 A1 | 3/2015 | Geist et al. | |
| 2015/0123815 A1* | 5/2015 | Mejegard | G06Q 10/06 340/870.07 |
| 2015/0254677 A1 | 9/2015 | Huxham et al. | |
| 2016/0299478 A1 | 10/2016 | Junk et al. | |

FOREIGN PATENT DOCUMENTS

| | | |
|---|---|---|
| DE | 102012214693 | 2/2013 |
| DE | 102011084789 | 4/2013 |
| EP | 1832943 | 9/2007 |
| WO | 2010094301 | 8/2010 |
| WO | 2013112421 | 8/2013 |
| WO | 2014197779 | 12/2014 |
| WO | 2014197785 | 12/2014 |

OTHER PUBLICATIONS

International Searching Authority, "Written Opinion", issued in connection with International Patent Application No. PCT/US2014/041265, dated Sep. 17, 2014 (8 pages).

The International Bureau, "International Preliminary Report on Patentability," issued in connection with International Patent Application No. PCT/US2014/041265, dated Dec. 17, 2015, 10 pages.
AMS AG, "RFID with Senses SL13A—ISO 15693 Sensor Tag IC," Product Brochure, Feb. 2013, 2 pages.
AMS AG, "RFID with Senses SL900A—EPC Gen2 Sensor Tag IC," Product Brochure, Feb. 2013, 2 pages.
Claire Swedberg, "BG Uses RFID Sensors to Track Pipe Corrosion," Jan. 31, 2011, [http://www.rfidjournal.com/articles/view?8181], retrieved on May 12, 2014, 2 pages.
D. De Donno et al., "Enabling Self-Powered Autonomous Wireless Sensors with New-Generations I2C-RFID Chips," 2013 IEEE MTT-S International Microwave Symposium Digest (MMT), Seattle, WA, Jun. 2013, 4 pages.
IDS Microchip AG, "SL900A Single-Chip EPC Data Logger with Sensor," Product Flyer, Mar. 2010, 2 pages.
IMPINJ, "Introducing Monza X Chips," [www.impinj.com], 2012, 2 pages.
Intelleflex Corporation, "Intelleflex SMT-8100 Special Purpose RFID Tag for Metals & Liquids", retrieved from the internet www.intelleflex.com, 2012, 2 pages.
Intelleflex Corporation, "Intelleflex TMT-8500 Temperature Monitoring Tag", retrieved from the internet www.intelleflex.com, 2010, 2 pages.
Tego, "Tego Chip Dual Memory (DM)," Brochure, [www.tegoinc.com], 2013, 2 pages.
William Frick & Company, "Solar Powered RFID Tag (Off-Metal)," [www.fricknet.com], Technical Data Sheet, 4 pages.
Emerson, "Fisher Fieldvue DVC6200 Series Digital Valve Controllers," Quick Start Guide, Jan. 2014, 68 pages.
ST Microelectronics, "Dynamic NFC/RFID tag IC with 16-Kbit EEPROM, energy harvesting, I$^2$C bus and ISO 15693 RF interface," Datasheet-Production Data, Jun. 2013, 143 pages.
Intelleflex, "Comparison of Intelleflex Semi-passive BAP, Active, and Passive RFID," 2015, [http://intelleflex.com/Products.Semi-Passive-vs-Active-RFID.asp], retrieved on Sep. 16, 2015, 1 page.
Daniel M. Dobkin, "The RF in RFID: UHF RFID in Practice," Newnes, Nov. 1, 2012, Burlington, MA, p. 38.
Daniel M. Dobkin, "The RF in RFID: UHF RFID in Practice," Newnes, Nov. 1, 2012, Burlington, MA, p. 40.
United States Patent and Trademark Office, "Non-Final Office Action," issued in connection with U.S. Appl. No. 14/297,179, dated Jun. 30, 2016, 28 pages.
The International Bureau, "International Preliminary Report on Patentability," issued in connection with International Patent Application No. PCT/US2014/041279, dated Dec. 8, 2015, 7 pages.
International Searching Authority, "Written Opinion," issued in connection with International Patent Application No. PCT/US2014/041279, dated Sep. 18, 2014, 6 pages.
International Searching Authority, "International Search Report," issued in connection with International Patent Application No. PCT/US2014/041279, dated Sep. 18, 2014, 5 pages.
United States Patent and Trademark Office, "Final Office Action," issued in connection with U.S. Appl. No. 14/297,179, dated Nov. 22, 2016, 50 pages
United States Patent and Trademark Office, "Non-Final Office Action," issued in connection with U.S. Appl. No. 14/684,016, dated Jun. 16, 2017, 19 pages.
United States Patent and Trademark Office, "Notice of Allowance," issued in connection with U.S. Appl. No. 14/297,179, dated Sep. 13, 2017, 36 pages.

* cited by examiner

BASE STATION FOR GATHERING DATA FROM LOCALIZED SENSORS

This application claims the benefit under 35 U.S.C. § 119(e) to U.S. Provisional Application 62/187,913 titled "BASE STATION FOR GATHERING DATA FROM LOCALIZED SENSORS," filed Jul. 2, 2015, which is incorporated herein by this reference in its entirety.

FIELD OF THE DISCLOSURE

This disclosure relates generally to process control systems and, more particularly, to a base station for gathering data from localized sensors.

BACKGROUND

Process control systems typically include one or more process controllers communicatively coupled to one or more field devices via analog, digital, or combined analog/digital buses. Information from the field devices and/or the controller is usually communicated over a data highway or communication network (e.g., HART protocol) to devices, such as operator workstations. These devices enable an operator to perform a variety of functions, including viewing the current state of a process of the process control system.

Traditionally, every instrument from which data is collected is individually wired to a Distributed Control System (DCS). Wiring costs can be several thousand dollars per instrument. In addition to the cost of the wire involved, which may be substantial, the cost of wiring an instrument to the DCS also includes the cost of the labor to install the wiring and the cost of obtaining the necessary certifications. Wiring certain instruments may be impractical when the data obtained from those instruments is not sufficiently critical to the operation of the process control system to justify the cost of the wiring. The inability to obtain data from certain locations in the process control system may result in not having information that may be potentially useful to the operator. For example, data, such as output pressure, is collected at a positioner, but that data does not necessarily correspond to the reaction of a valve coupled to that positioner, and there is no indication of the status of other nearby instruments. Any additional data the valve and other instruments might provide could be helpful to the operator in determining the state of the process control system.

Wireless transmission of data from instruments having non-critical locations in a process control system have been based on, for example, Wireless HART. However, the update rates using such communications are slow (e.g., once a minute) and not practical for use with data that is time dependent. Additionally, Wireless HART based communications require remote instruments or sensors to include batteries. However, batteries have to be replaced periodically due to the amount of power required to transmit the data and, thus, often involve a tradeoff between power and range. Using such known communications, an instrument typically transmits data a short distance to another transmitter, which then relays the data to subsequent transmitters until the data eventually reaches the DCS. However, using multiple instruments to relay data in this manner can be impractical in areas where no instrumentation is required.

SUMMARY

An example apparatus includes a sensor to be operatively coupled to field equipment, the sensor has a radio frequency transmitter to send a signal to a base station, the base station has a radio frequency interface to receive the signal from the sensor and a first controller to collect data from the signal and store the data in a memory. The apparatus further includes a second controller operatively coupled to the first controller to relay the data to an asset management system and a local control panel operatively coupled to the base station to send additional data to the base station, wherein the first controller stores the additional data in the memory.

An example method includes collecting, via a sensor, data relating to first field equipment, transmitting the data to a base station for storage in a memory of the base station, accessing, via a controller, the data in the memory of the base station, and relaying the data to an asset management system.

Another example apparatus includes a radio frequency identification interface to receive data from a sensor of a process control system, a controller to collect the data received by the radio frequency identification interface, and a memory to store the data, wherein the data may be retrieved via the radio frequency identification interface and an asset management system of the process control system.

DETAILED DESCRIPTION

Figure 1:
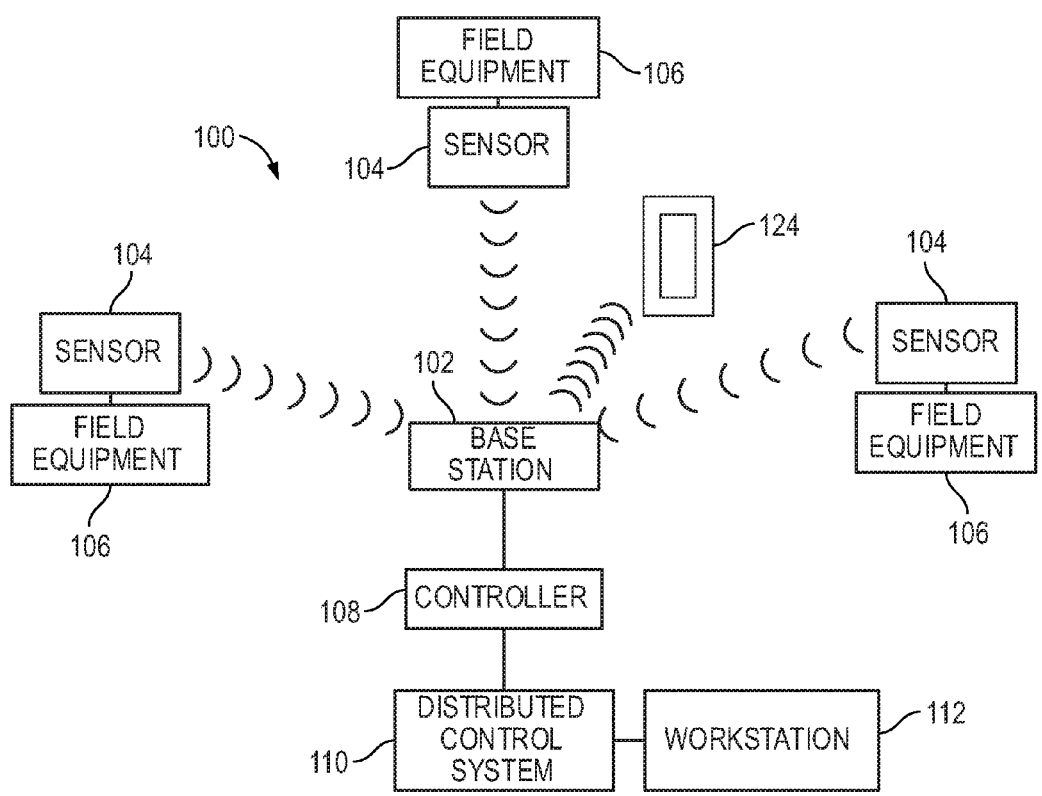
FIG. 1 is a diagram of an example apparatus that may be implemented for local asset area networking using a base station and sensors.

The apparatus and methods described herein may be employed in process control systems to collect data relating to instruments, such as valves, which data would otherwise be impractical to obtain using known methods. More specifically, the apparatus and methods described herein enable data collection from process control instruments and field equipment by integrating sensors capable of wirelessly communicating with the instruments and field equipment. In some examples described herein, one or more sensors may collect and transmit data (e.g., pressure data, temperature data, data indicating a state of a valve, etc.) to a base station capable of storing the data and sending the data to a DCS. The base station may be operatively coupled to a field device (e.g., a controller, a positioner, etc.), which may have been already hardwired to the DCS, thereby enabling the base station to relay the data collected by the plurality of sensors to the DCS. The data can then be accessed by an operator via an operator workstation, who may use the data collected by the sensors to better evaluate the state of the process control system.

In the example apparatus and methods described herein, wireless communication occurs via one or more radio frequency identification (RFID) interfaces. An RFID transmitter is associated with each sensor and an RFID antenna is integrated into the base station to receive write signals transmitted from the sensor(s). The base station may include a high frequency (HF) RFID interface and an ultra-high frequency (UHF) RFID interface. The sensors may communicate with the base station via the UHF interface to send the write signals including data and locations indicating where the data should be written to a non-volatile memory onboard the base station. The base station may receive signals from more than one sensor to write data to more than one location of the memory. For example, a first sensor may transmit a write signal containing data and a first write location associated with a first location of the non-volatile memory, and a second sensor may transmit a second write signal including second data and a second write location associated with a second location of the non-volatile memory, and so forth.

The HF interface can be used to pair a sensor with the base station. Using a tap-to-pair process, the sensor can be paired with the base station via the HF interface by holding the sensor proximate to the base station. The tap-to-pair process involves holding the sensor sufficiently close to the base station to enable the base station and the sensor to communicate via the HF interface and use near field communications (NFC) to exchange data such as device identification information. The base station can read the identification information from the sensor via NFC and begin communicating with the sensor through the UHF interface. The above-noted pairing process reduces the amount of configuration required to initialize communication between the sensor and the base station.

The HF interface can also be used for other types of data transfer. A user or operator may gather data from the base station via the HF interface using a handheld device capable of communicating via an HF interface (e.g., NFC). The data can be transferred from the base station to the handheld device by bringing the handheld device into close proximity (e.g., 1 inch to 3 feet) to the base station. In some examples, the HF interface is also capable of harvesting power from the handheld device. The power harvested from the handheld device may be sufficient to power the base station to transfer data between the base station and the handheld device.

In some examples, the base station may include an additional wireless communication interface (e.g., a Bluetooth interface). For example, the additional interface may be a low-energy Bluetooth interface and may be operative to send alerts and alarms to the DCS.

In the examples described herein, the base station is operatively coupled to a field device (e.g., controller, a positioner, etc.) that is hardwired to the DCS. Data stored in the non-volatile memory of the base station is communicated to the DCS via the hardwired communication line(s) of the field device to which the base station is coupled. The hardwired communication line(s) may be a communication channel connected to an I/O port of the DCS and dedicated for use by the field device. The base station may communicate with the field device using one or more communication protocols or methods (e.g., HART, UART). In some embodiments, the base station is operatively coupled to the field device via auxiliary terminals of the field device. Once the data is communicated to the DCS, an operator may view and analyze the data using an operator workstation.

In some embodiments, the base station may be operatively coupled to a Local Control Panel (LCP) via a bus (e.g., an I2C bus used by the base station), either with a wired or wireless connection. Connecting the LCP to the base station enables the data collected by the LCP during testing (e.g., valve stroke testing) to be stored in the non-volatile memory of the base station. The data collected by the LCP can be communicated to the DCS in the same manner as the data collected by the sensors. Additionally, because the LCP is communicatively coupled to the non-volatile memory, the LCP can be used as a data access point if equipped with an HF and/or UHF interface. For example, data may be collected through the HF interface by an operator holding a handheld device in proximity to the HF interface integrated within the LCP. Integrating an HF and/or UHF interface within the LCP increases accessibility to the data collected by the base station because an LCP may be used to manually control tests and, thus, are always accessible to the operators.

FIG. 1 is a diagram of an example apparatus 100 that may be implemented for gathering data from nearby or localized sensors. The example apparatus 100 includes a base station 102 that receives wireless communications from one or more sensors 104 located proximate to (e.g., within 30 feet of) the base station 102. The base station 102 may be operative to receive data from the sensor(s) 104 via an RFID interface (e.g., an ultra-high frequency RFID interface).

The sensors 104 are operatively coupled to respective field equipment 106, which may include valves or other process control devices. The sensors 104 are capable of collecting data associated with the field equipment 106 to which the sensors 104 are coupled. For example, the sensors 104 may collect temperature data, pressure data, data relating to a state of a valve (e.g., whether the valve is open or closed), or any other measurements that are potentially useful to an operator of a process control system. Once the sensors 104 have collected the data, the data is transmitted to the base station 102 via the RFID interface. In some examples, one of the sensors 104 may communicate with one or more other sensors 104.

The sensors 104 are paired to the base station 102 using a tap-to-pair process. The tap-to-pair process involves a high frequency (HF) interface of the base station 102 reading a signal transmitted by an HF transmitter on the sensors 104. The signal contains identifying information regarding the sensor 104, which the base station 102 then uses to initiate communication with the sensor 104 via the UHF interface of the base station 102. Using the tap-to-pair process to initiate communication between the base station 102 and the sensors 104 decreases the amount of manual configuration that is required, thereby making the base station 102 and sensors 104 easy to implement in an existing process control system.

After the RFID interface of the base station 102 receives the data, the data is stored in a non-volatile memory on board the base station 102. A microcontroller associated with the base station 102 then gathers the data from the memory to send to a controller 108 (e.g., a positioner, a digital valve controller, a pneumatic controller, etc.). In some cases, the controller 108 and base station 102 may communicate using a communication protocol such as, for example, HART, UART, etc. In some examples, the base station 102 is connected to the controller 108 via auxiliary ports of the controller 108. The controller 108 relays the data from the base station 102 to a Distributed Control System (DCS) 110 (e.g., an asset management system) via a dedicated communication channel associated with the controller 108. The controller 108 may be connected to the DCS 110 via an I/O port on the DCS 110. Once the DCS 110 has received the data, an operator can view and manipulate the data via an operator workstation 112. The operator may be able to better evaluate the state of the process control system by analyzing the data gathered by the base station 102 and sensors 104.

In addition to communicating with the controller 108, the base station 102 may also use the controller 108 as a power source. The power obtained from the controller 108 is sufficient to enable the base station 102 to function without significantly affecting the operation of the controller 108. The base station 102 may receive a control signal (e.g., 4-20 mA) from the controller 108 where the control signal also supplies power to the base station 102 during normal operation. At other times (e.g., when the process control system 100 is shut down), the base station 102 may harvest energy from a nearby portable device 124 (e.g., a device with an HF RFID interface, such as a smartphone or tablet) capable of near field communications. The portable device 124 may be used as a power source when the process control system 100 is shut down and the controller 108 is unpowered. Harvesting power from the portable device 124 enables the base station 102 to transmit information (e.g., device information such as serial number, part number, etc.) to the portable device 124. Data gathered by the base station 102 from the sensors 104 can also be transferred from the base station 102 to the portable device 124 in shut down situations or during normal operation.

Figure 2:
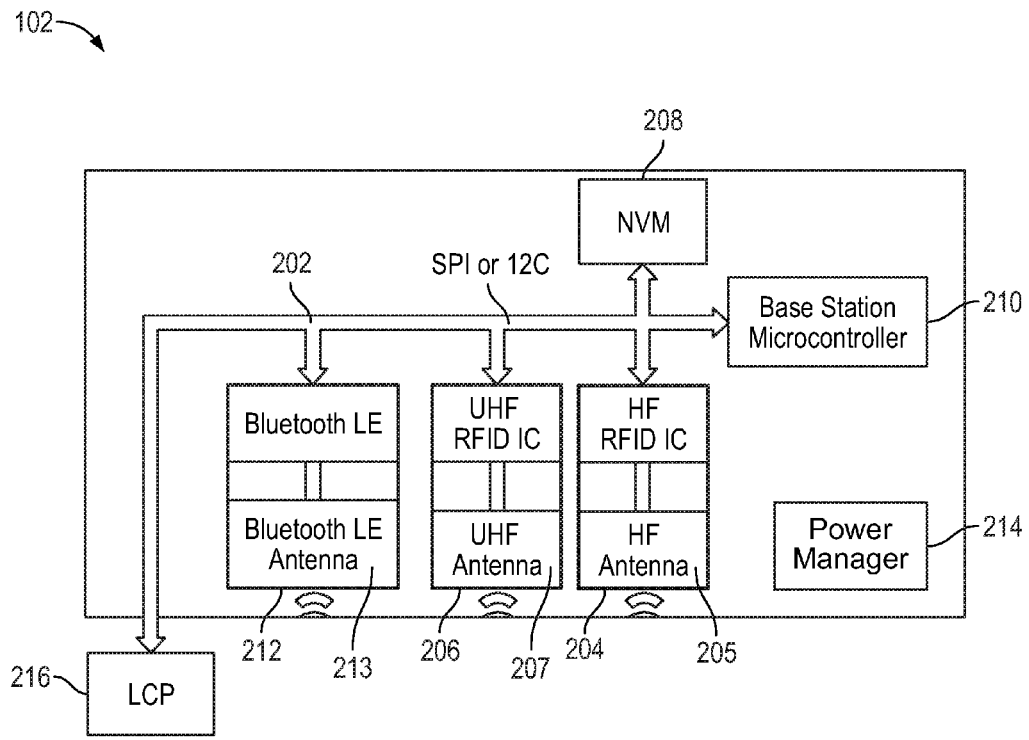
FIG. 2 is a diagram of example implementation of the base station of FIG. 1.

FIG. 2 depicts an example implementation of the base station 102 of FIG. 1. As shown in FIG. 2, the base station 102 includes a bus 202 (e.g., a Serial Peripheral Interface (SPI) bus, an inter-Integrated Circuit (I2C) bus, etc.). The bus 202 is separate from a field bus of the process control system. In some examples, the bus 202 is an SPI bus, which is a four-wire serial bus capable of controlling multiple devices. In other examples, the bus 202 is an I2C bus, which is a two-wire serial bus where one wire is a clock and the other wire is for data communication. An I2C bus may be communicatively coupled with up to eight devices.

The base station 102 also includes an HF interface 204 coupled to the bus 202. The HF interface 204 may include an antenna 205 to receive signals from other HF devices, such as the sensors 104 and the portable device 124. The HF interface 204 can be used for pairing (e.g., NFC tap-to-pair) and/or for data transfer. For example, one or more of the sensors 104 may be paired with the base station 102 using the tap-to-pair process. Once the sensors 104 are paired, they can communicate data to the base station 102. Data transfer may occur via the HF interface 204 when, for example, the operator uses the portable device 124 to access information (e.g., identification information such as a serial number, a part number, maintenance information and schedules, etc.) associated with the base station 102 or nearby field equipment 106. The operator may also access and collect data gathered by the sensors 104 with the portable device 124 via the HF interface 204.

A UHF interface 206 is also included in the base station 102. The UHF interface 206 is coupled to the bus 202 and includes a UHF antenna 207. The UHF interface 206 is the primary interface used for data collection and communicates with one or more of the sensors 104. The UHF interface 206 receives signals from one or more of the sensors 104 paired with the base station 102. The signal from each sensor 104 includes data and a write location. Each sensor uses a different location of a non-volatile memory (NVM) 208 coupled to the bus 202 to which the sensor 104 is to write the data. For example, a first one of the sensors 104 transmits first data to be written to a first location of the NVM 208 and a second one of the sensors 104 transmits second data to be written to a second location of the NVM 208. The UHF interface 206 is the preferred method of data communication because UHF communication uses significantly less power than many other forms of wireless communication, such as Bluetooth, and is significantly faster than communication protocols that are commonly used in process control systems, such as, for example, Wireless HART.

Both the UHF interface 204 and the HF interface 206 may include a relatively small amount of memory and can store data temporarily during a data transfer. Including the relatively small amount of memory facilitates a smooth data transfer between the UHF and HF interfaces 204 and 206 and the NVM 208.

A microcontroller 210 is connected to the bus 202 to manage the operations of the base station 102 and distribute data to specified locations. For example, the microcontroller 210 may write the data received by the UHF interface 206 to designated locations in the NVM 208. The microcontroller 210 may also gather the data from the NVM 208 when the data is requested and transmit the data to the DCS 110 via the controller 108. The microcontroller 210 may be commutatively coupled to a microcontroller (not shown) of the controller 108 to communicate instructions (e.g., when to send data). For example, once the data has been gathered from the NVM 208, the microcontroller 210 may communicate the data to the DCS 110 via the controller 108, as described in connection with FIG. 1. In some examples, the microcontroller 210 may also gather information from the controller 108 (e.g., the current operational status of the process control system, alerts, etc.). In some examples the microcontroller 210 may also relay alerts received via a Bluetooth interface 212 to the DCS 110 via the controller 108.

In some examples, the base station 102 may include the Bluetooth low-energy (LE) interface 212 that includes a Bluetooth LE antenna 213. The Bluetooth LE interface 212 may communicate plant alarms and alerts, but is not the primary method of data communication because of the high amount of energy required for data transfer via the Bluetooth LE interface 212. The Bluetooth LE interface 212 may be integrated with alarm systems currently in place in the process control system, such as Field Detect.

A power manager 214 is included in the base station 102. The power manager 214 may manage the power from an external power source (e.g., the 4-20 mA line from the controller 108, power from another process control device, etc.) during normal operation. In some examples, the power manager 214 may also be operative to harvest energy from nearby UHF or HF devices via the UHF or HF interfaces 204 and 206. Energy harvested from an HF device (e.g., the portable device 124) can be up to 6 mA at 3.3 V, which is sufficient to power the base station 102 in the absence of an external power source. In some examples, the power manager 214 may harvest energy to gather data (e.g., device information, data collected by the sensors, etc.) when the process control system is shut down and/or the external power source has been disrupted. For example, the operator carrying the portable device 124 can gather information from the base station 102 when the process control system is shut down because the energy harvested from the portable device 124 can sufficiently power the base station 102 to transfer data to the portable device 124 via the HF interface 204. In some examples, the power manager 214 can also harvest energy from a UHF capable device via the UHF interface 206.

In some examples, the base station 102 may include a Local Control Panel (LCP) 216 coupled to the base station 102 via a wired or wireless connection to the bus 202. LCPs are typically used for manually operating stroke tests and, thus, are typically configured to be easily accessible to an operator. Currently, LCPs are hardwired to positioners via DI/DO channel. The base station 102 can collect data from the LCP 216 via the bus 202 and write the data from the LCP 216 to the NVM 208. Storing the data in the NVM 208 enables the data from the LCP 216 to be communicated to the DCS 110 in the same manner as the data collected from the sensors 104. In some examples, the LCP 216 may include an HF and/or UHF interface (not shown) to enable the operator to collect data from the LCP 216 using the portable device 124. In such examples, the operator can access any data stored in the NVM 208 because the LCP 216 is coupled to the bus 202.

Figure 3:
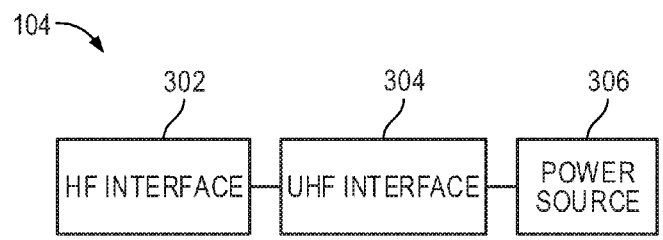
FIG. 3 is a diagram of example implementation of the sensor of FIG. 1.

FIG. 3 depicts an example implementation of the sensor 104 of FIG. 1. The example sensor 104 may be any kind of sensor typically used in a process control environment (e.g., a temperature sensor, pressure sensor, position sensor, etc.). The sensor 104 may be attached to any field equipment 106 from which the operator would like to collect data. The example sensor depicted in FIG. 3 includes an HF interface 302 that may be used to initiate communications with the base station 102 using the tap-to-pair process. The HF interface 302 may also enable the operator with a portable device 124 to collect information (e.g., identifying information such as part number, serial number, etc.) from the sensor 104 by bringing the portable device 124 in proximity to the sensor 104.

The sensor 104 also includes a UHF interface 304 to communicate data collected by the sensor 104 to the base station 102. The UHF interface 304 of the sensor 104 communicates with the UHF interface 206 of the base station 102. For example, the UHF interface 304 of the sensor 104 transmits a signal, which is received by the UHF antenna 207 of the UHF interface 206. In some examples, the UHF interface 304 is capable of transmitting and receiving data. In examples where the UHF interface 304 is capable of transmitting and receiving data, the UHF interface 304 is capable of two-way communications with the base station 102. Thus, in addition to transmitting data to the base station 102, the senor 104 may also receive data or other information from the base station 102. In some examples, a first one of the sensors 104 may communicate with a second one of the sensors 104.

The sensor 104 also includes a power source 306. In some examples, the power source 306 is a battery. Because the UHF interface 304 uses a relatively small amount of power to transfer data, the battery lasts longer than if a different form of wireless communication, such as Bluetooth, were used. In other examples, the sensor 104 is coupled to field equipment 106 that is powered and the power source 306 for the sensor 104 is coupled to the power source of the field equipment 106.

Though the sensor 104 of FIG. 3 is depicted as including only the HF interface 302, the UHF interface 304 and the power source 306, other components, such as a microcontroller or a memory, may also be included in some example sensors 104.

Figure 4:
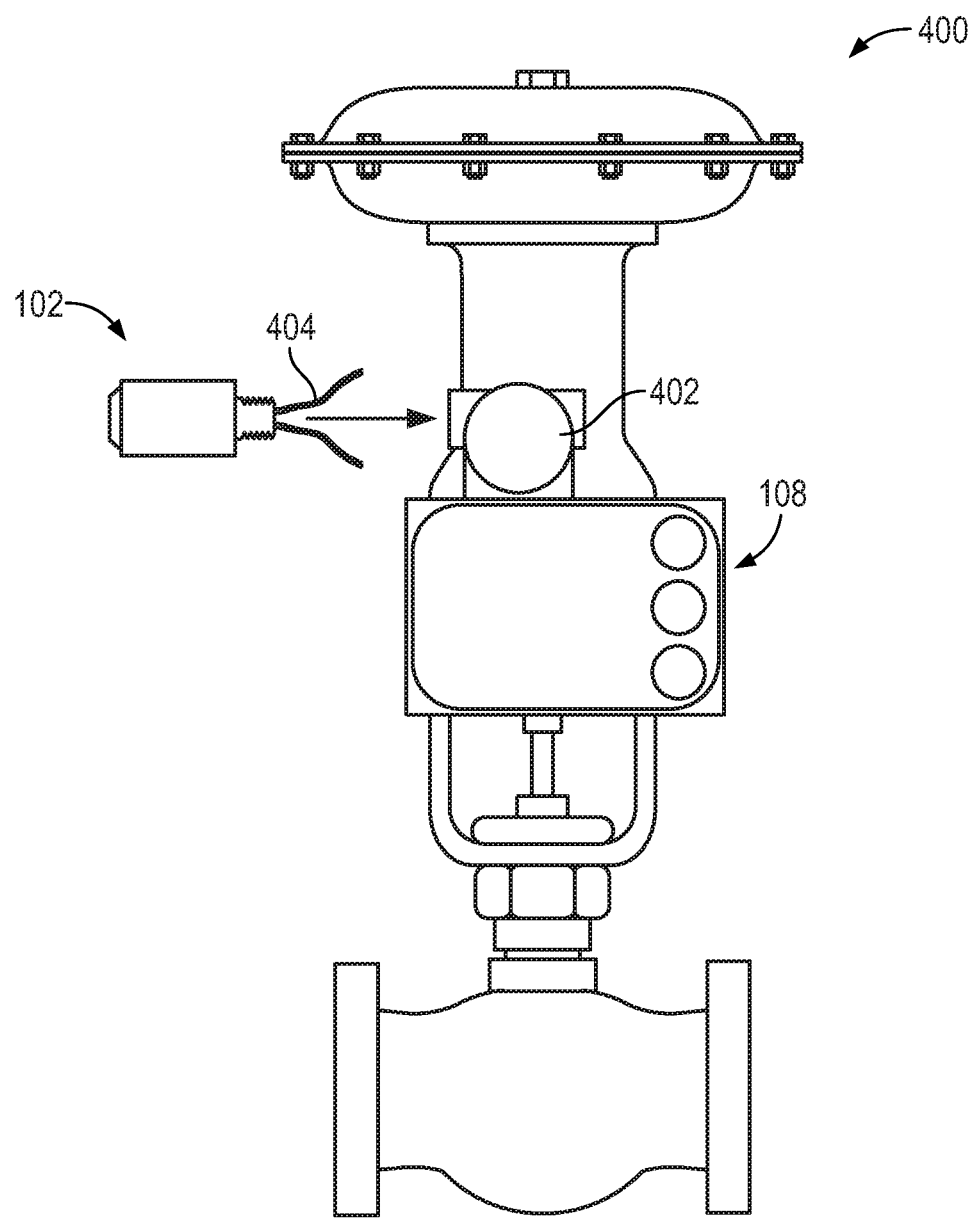
FIG. 4 depicts a particular implementation of the example base station of FIG. 1.

FIG. 4 depicts an example implementation 400 of the base station 102 of FIG. 1. In the example implementation 400, the base station 102 is coupled to an auxiliary port 402 of the controller 108 via lead wires 404. However, the base station 102 may instead be coupled to the controller 108 via communication protocols, such as HART or UART. In the example implementation 400, the controller 108 is a Digital Valve Controller (e.g., a Fisher® FIELDVUE™ DVC6200) to control double acting pneumatic actuators, but any other type of controller or positioner may be used in other example implementations.

The examples of FIGS. 1-4 may be implemented by any combination of hardware, software and/or firmware. Thus, the examples could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or method claims of this patent to cover a purely software and/or firmware implementation, the examples are hereby expressly defined to include a tangible computer readable storage device or storage disk such as a memory, a digital versatile disk (DVD), a compact disk (CD), a Blu-ray disk, etc. storing the software and/or firmware. Further still, the examples of FIGS. 1-4 may include one or more elements, processes and/or devices and/or may include more than one of any or all of the elements, processes and devices.

Figure 5:
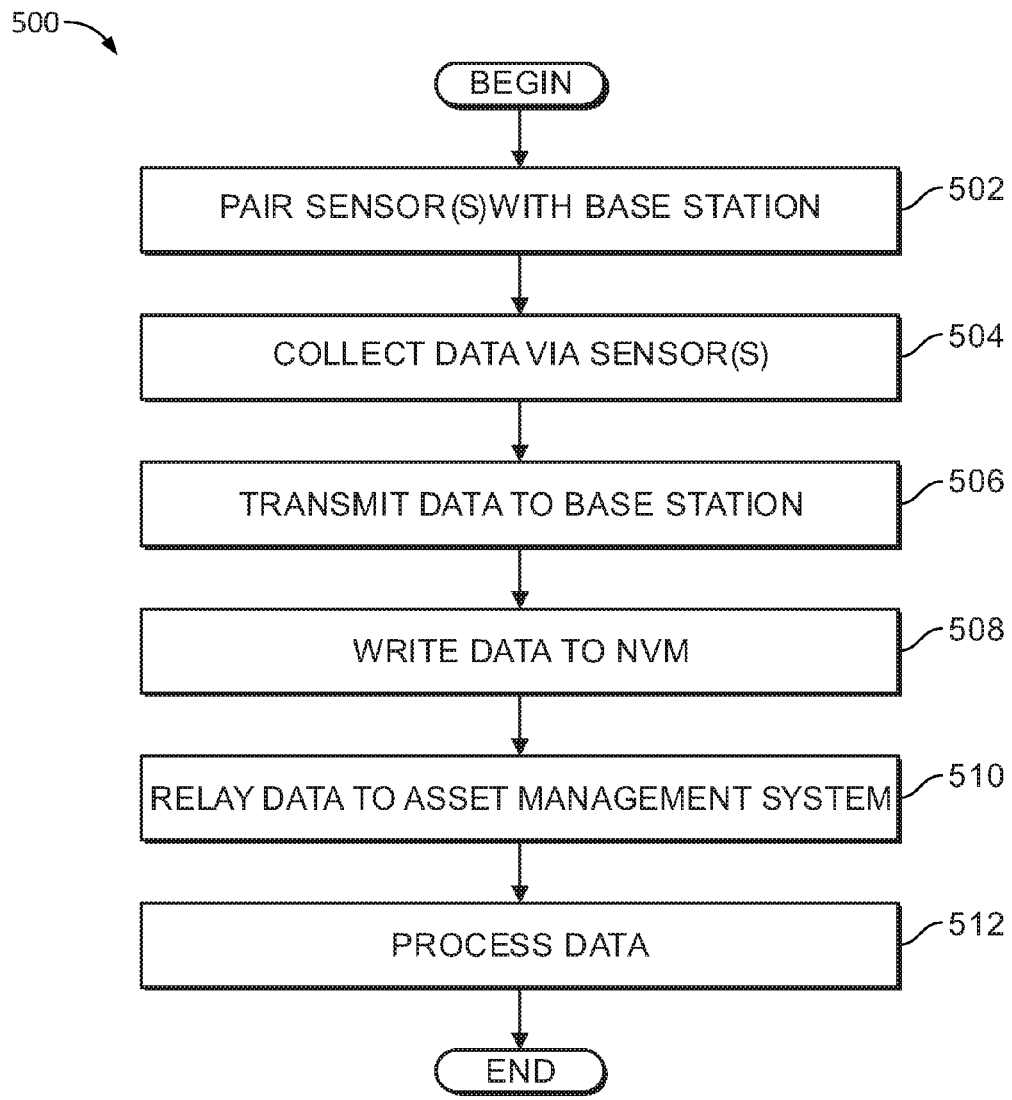
FIG. 5 depicts an example method that may be performed to implement the examples described herein.

FIG. 5 is an example method 500 that may be used with the example apparatus described herein. The example method is initiated when one or more sensors 104 is paired with the base station 102 via the HF interfaces 204 and 302 (block 502). After the sensor(s) 104 are paired, the sensor(s) 104 collect data relating to the process equipment 106 to which they are connected (block 506). The sensor(s) 104 then transmit data to the base station 102 via the UHF interfaces 206 and 304 (block 506). Once the base station 102 has received the data, the microcontroller 210 writes the data in the NVM 208 (block 508). The data is then relayed, via the controller 108, to the DCS 110 (block 510). Once the DCS 110 receives the data, the data may be processed to determine an operational state of one or more components (e.g., the field equipment) of the process control system, or a state of the process control system as a whole (block 512).

Figure 6:
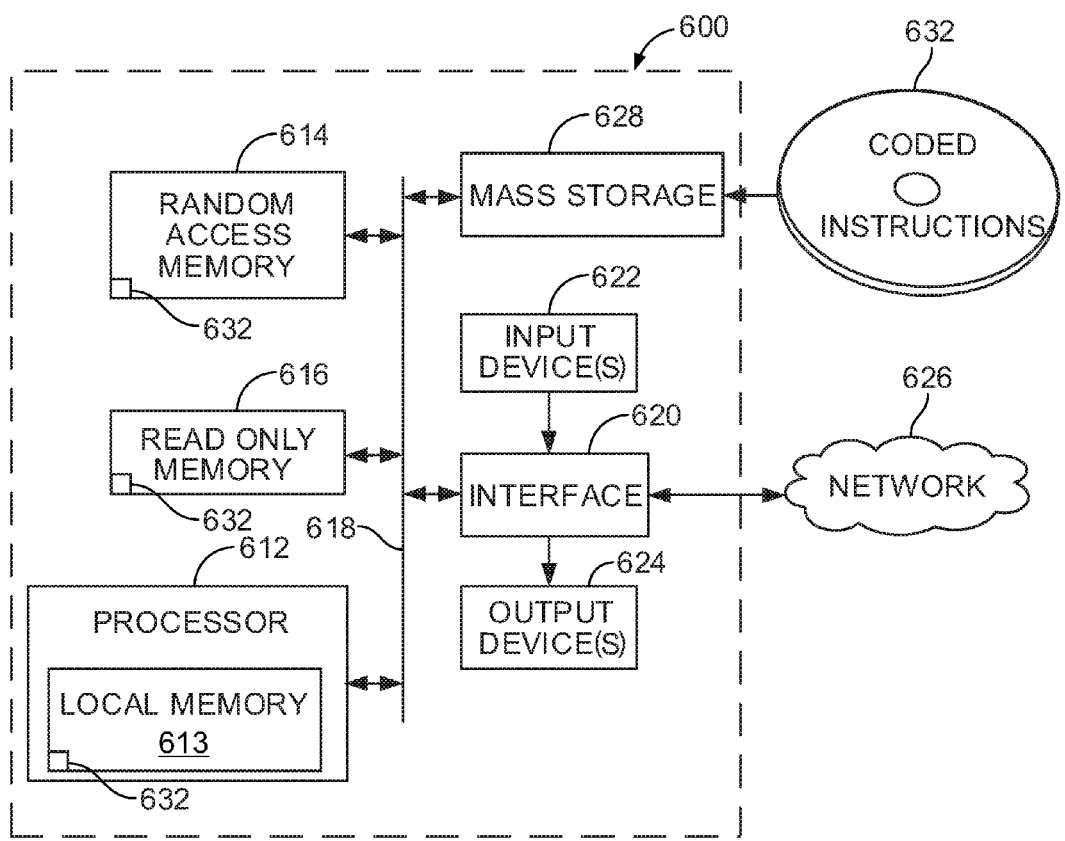
FIG. 6 is a diagram of a processor platform which may be used to implement examples disclosed herein.

FIG. 6 is a block diagram of an example processor platform 600 capable of executing instructions to implement at least a portion of the method 500 of FIG. 5. The processor platform 600 can be, for example, a server, a personal computer, a mobile device (e.g., a cell phone, a smart phone, a tablet such as an iPad™), a personal digital assistant (PDA), an Internet appliance or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) 622 can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 688 include floppy disk drives, hard drive disks, compact disk drives, Blu-ray disk drives, RAID systems, and digital versatile disk (DVD) drives.

Coded instructions 632 to implement at least a portion of the method 500 of FIG. 5 may be stored in the mass storage device 628, in the volatile memory 614, in the non-volatile memory 616, and/or on a removable tangible computer readable storage medium such as a CD or DVD.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    a sensor to be operatively coupled to field equipment, the sensor having a radio frequency transmitter to send a signal to a base station, the base station having a housing comprising:
        a first radio frequency interface to receive the signal from the sensor;
        a first controller to collect data from the signal and store the data in a memory; and
        a second radio frequency interface to communicate the data to a portable device;
    a second controller operatively coupled to the first controller to relay the data to an asset management system; and
    a local control panel operatively coupled to the base station to send additional data to the base station, wherein the first controller stores the additional data in the memory.

2. The apparatus as defined in claim 1, wherein the second controller is operatively coupled to a field device of a process control system.

3. The apparatus as defined in claim 1, wherein the base station further comprises a Bluetooth interface to send alerts or alarms to the asset management system.

4. The apparatus as defined in claim 1, wherein the base station further comprises a power management module to harvest energy from a nearby radio frequency emitting device to communicate with the radio frequency emitting device.

5. The apparatus as defined in claim 1, wherein the signal transmitted by the sensor comprises a write signal including the data and a write location to the base station.

6. The apparatus as defined in claim 1, wherein the sensor is paired with the base station using near field communication to obtain a device identification.

7. The apparatus as defined in claim 1, wherein the local control panel further comprises an input operative to perform valve testing.

8. The apparatus as defined in claim 1, wherein the base station further includes a bus, the first radio frequency interface, the second radio interface, and the controller coupled to the bus of the base station.

9. The apparatus as defined in claim 8, wherein the memory of the base station is coupled to the first radio frequency interface, the second radio interface, and the controller via the bus.

10. The apparatus as defined in claim 8, wherein the local control panel is coupled to the base station via a wired connection to the bus of the base station.

11. A method comprising:
    collecting, via a sensor, data relating to first field equipment;
    transmitting the data to a base station using an ultra-high frequency interface of the base station for storage in a memory of the base station;
    accessing, via a mobile device, the data in the memory of the base station using a high frequency interface of the base station or a local control panel operatively coupled to the base station via a bus, the local control panel located remotely from the base station; and
    relaying the data to an asset management system via a controller of the base station.

12. The method as defined in claim 11 further comprising pairing the sensor with the base station by placing the sensor proximate to the base station and using near field communication to obtain a device identification.

13. The method as defined in claim 11 further comprising processing the data to determine a status of a field device.

14. The method as defined in claim 13 further comprising sending an alert or an alarm to a workstation, via a Bluetooth interface of the base station, based on the determined status of the field device.

15. The method as defined in claim 11, wherein relaying the data further comprises sending the data from the controller to a positioner using a UART communication protocol.

16. The method as defined in claim 11 further comprising transmitting data to the memory of the base station from the local control panel.

17. The method as defined in claim 16, further including performing valve stroke testing via the local control panel, the data transmitted from the local control panel to the memory of the base station related to the valve stroke testing.

18. An apparatus comprising:
    a first radio frequency identification interface to receive data from a sensor of a process control system;
    a controller to collect the data received by the radio frequency identification interface;
    a second radio frequency identification interface to communicate data to a portable device; and
    a memory to store the data, wherein the data may be retrieved via the second radio frequency identification interface, a local control panel coupled to the memory via bus, and an asset management system of the process control system communicatively coupled to the controller.

19. The apparatus as defined in claim 18, further comprising a second controller to access the data from the memory and relay the data to the asset management system via a positioner having a dedicated communication channel.

20. The apparatus as defined in claim 18, wherein the first radio frequency identification interface receives the data from one or more sensors via an ultra-high frequency radio frequency interface.

21. The apparatus as defined in claim 18, wherein local control panel is to perform tests on one or more components of the process control system, wherein the local control panel is to collect data during the tests, the data to be stored in the memory.

22. The apparatus as defined in claim 18 further comprising a Bluetooth interface to send alerts or alarms to the asset management system.

* * * * *